(12) United States Patent
Azizi Pourzadeh

(10) Patent No.: US 10,577,112 B2
(45) Date of Patent: Mar. 3, 2020

(54) EMERGENCY EJECTION SEAT WITH PROPULSION SYSTEM

(71) Applicant: Seyednezam Azizi Pourzadeh, Gilan (IR)

(72) Inventor: Seyednezam Azizi Pourzadeh, Gilan (IR)

(*) Notice: Subject to any disclaimer, the term of this patent is extended or adjusted under 35 U.S.C. 154(b) by 365 days.

(21) Appl. No.: 15/686,712

(22) Filed: Aug. 25, 2017

(65) Prior Publication Data
US 2018/0162539 A1 Jun. 14, 2018

(30) Foreign Application Priority Data
Aug. 25, 2016 (IR) .................. 139550140003006755

(51) Int. Cl.
*B64D 25/10* (2006.01)
*B64C 39/02* (2006.01)
*B64C 11/00* (2006.01)
*B64D 27/24* (2006.01)

(52) U.S. Cl.
CPC .............. *B64D 25/10* (2013.01); *B64C 11/00* (2013.01); *B64C 39/026* (2013.01); *B64D 27/24* (2013.01); *Y02T 50/44* (2013.01)

(58) Field of Classification Search
CPC ................................ B64D 25/10; B64D 25/12
See application file for complete search history.

(56) References Cited

U.S. PATENT DOCUMENTS

| | | |
|---|---|---|
| 3,020,011 A | 2/1962 | Beem |
| 4,720,064 A | 1/1988 | Herndon |
| 4,871,131 A | 10/1989 | Bernier |
| 5,297,761 A | 3/1994 | Kendall |

*Primary Examiner* — Nicholas McFall
(74) *Attorney, Agent, or Firm* — NovoTechIP International PLLC

(57) ABSTRACT

An emergency ejection seat with a propulsion system is disclosed. The propulsion system may be provided by a propeller-equipped brushless motor. The emergency ejection seat includes speed controllers that can accelerate and move the seat with two different speeds. Several wedge-shaped recesses along the rear of the seat help limit the effects of a vacuum.

20 Claims, 6 Drawing Sheets

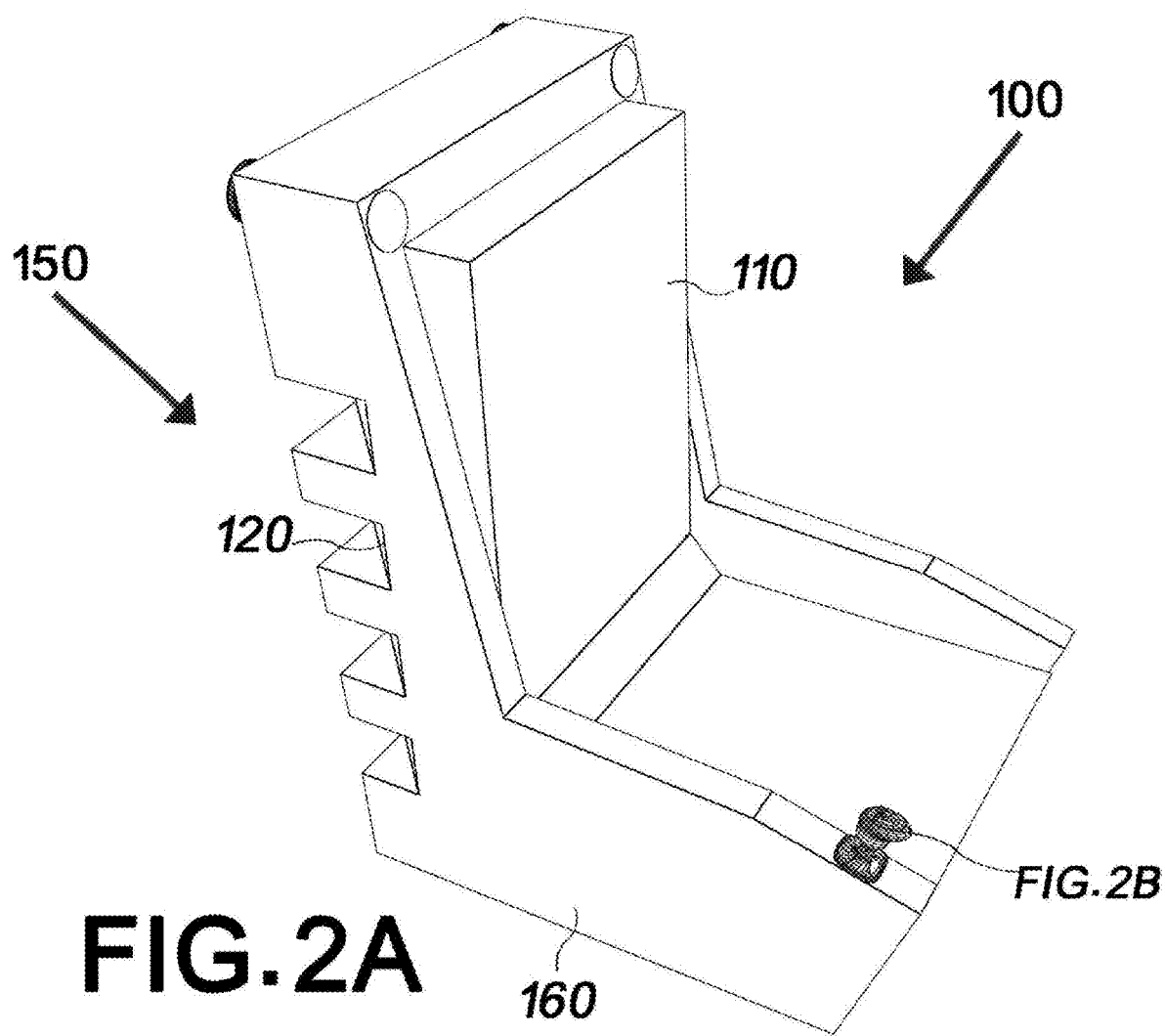

EMERGENCY EJECTION SEAT WITH PROPULSION SYSTEM

CROSS REFERENCE TO RELATED APPLICATION

This application claims the benefit of priority to an Iran application serial number 139550140003006755 filed on Aug. 25, 2016, which is incorporated by reference herein in its entirety.

TECHNICAL FIELD

The present disclosure relates generally to an aircraft emergency ejection seat and more particularly to an emergency seat equipped with a propulsion motor and speed controller.

BACKGROUND

In aircraft, an ejection seat or ejector seat is a system designed to rescue the pilot or other crew of an aircraft (usually military) in an emergency. In most designs, the seat is propelled out of the aircraft by an explosive charge or rocket motor, carrying the pilot with it. The concept of an ejectable escape crew capsule has also been tried. Once clear of the aircraft, the ejection seat deploys a parachute. Ejection seats are common on certain types of military aircraft.

SUMMARY

In one implementation, the present disclosure is directed to an emergency ejection seat system. The system includes a seat, where the seat includes a first side portion extending along a first side of the seat, a second side portion extending along a second side of the seat, and a rear portion associated with a back of the seat. A hollow channel is formed in the rear portion, where the hollow channel is configured to receive a propeller system. The propeller system includes a brushless motor, a propeller, a receptacle, and a gear motor, where the receptacle is configured to receive the brushless motor. The brushless motor is coupled to the propeller. In addition, the system includes a first air duct fan and a second air duct fan, the first air duct fan being located in an opening formed in a forward-facing side of the seat, and the first air duct fan being configured to move the seat axially after ejection. The seat additionally includes a power source and a user interface. The user interface includes a switch, where the switch is configured to turn the gear motor on and off.

Other systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

Features of the subject technology are set forth in the appended claims. However, for purpose of explanation, several implementations of the subject technology are set forth, in the following figures.

FIGS. 2A and 2B illustrate an implementation of a handle, speed controllers, and a switch on a pilot seat arm;

DETAILED DESCRIPTION

In the following detailed description, various examples are presented to provide a thorough understanding of inventive concepts, and various aspects thereof that are set forth by this disclosure. However, upon reading the present disclosure, it may become apparent to persons of skill that various inventive concepts and aspects thereof may be practiced without one or more details shown in the examples. In other instances, well known procedures, operations and materials have been described at a relatively high-level, without detail, to avoid unnecessarily obscuring description of inventive concepts and aspects thereof.

In one general aspect, the instant application describes an emergency ejection seat with a speed controller and propulsion system. A propulsion force may be provided by a propeller-equipped brushless motor. The present application also describes an emergency ejection seat with speed controllers to move with two different speeds.

Figure 1:
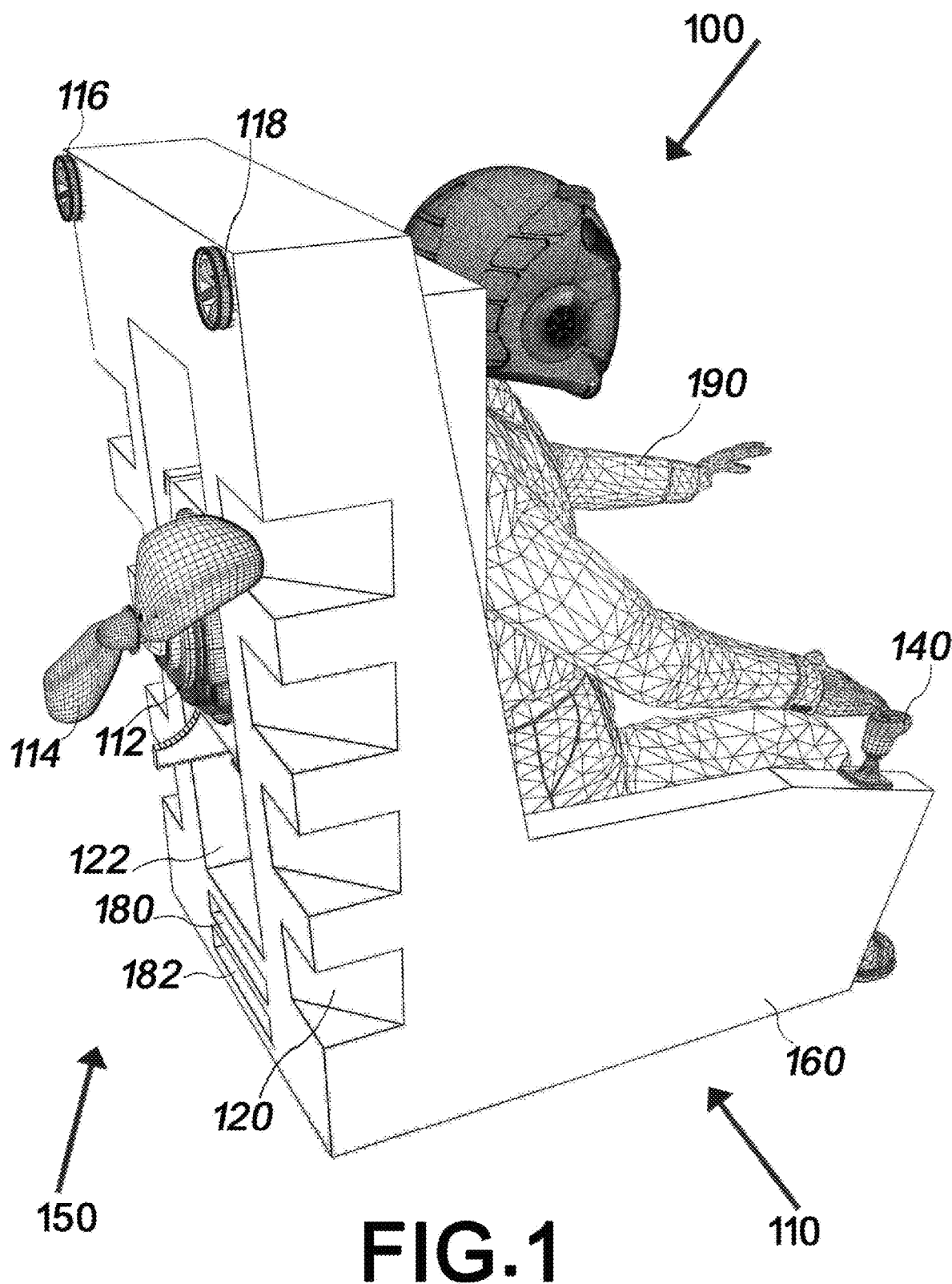
FIG. 1 illustrates an implementation of an emergency ejection seat with a speed controller and propulsion system.

An overview of the system 100 is presented in FIG. 1. Referring to FIG. 1, an isometric side view of an implementation of an emergency ejection seat with a speed controller and propulsion system is depicted. In different implementations, an emergency ejection system ("system") 100 may include a rear portion 150 and two side portions 160. The rear portion 150 is configured as a back of a pilot seat ("seat") 110, and the side portions 160 can be associated with the arms or sides of the seat. Thus, in FIG. 1, though only one side portion can be seen clearly, it can be understood that the system 100 includes two side portions 160 disposed on either side of the seat 110 (i.e., a first side and a second side of the seat) and extending forward of the rear portion 150 such that the rear portion 150 is disposed between the first side portion and the second side portion.

In addition, the system 100 disclosed, herein can include a brushless motor 112, a propeller 114, a first air duct fan ("first fan") 116, and a second air duct fan ("second fan") 118. The rear portion 150 may be configured to receive or accommodate various components of the system 100 and/or to allow system 100 to be integrated into a larger apparatus or system. For example, as seen in FIG. 1, a rearward facing side of the rear portion 150 further comprises a plurality of substantially wedge-shaped recesses ("recesses") 120, as well as a hollow channel 122. In one implementation, the arrangement of the recesses 120 can be substantially symmetrical with respect to a longitudinal midline of the rear portion 150. In addition, the hollow channel 122 can be aligned with the longitudinal midline in some cases. Thus, while the components comprising system 100 can be located along different portions of the system 100, in an exemplary implementation, many components can be associated with, attached to, or located along the rear portion 150 of the system 100.

In different implementation, the system 100 can further comprise a power source. For example, in FIG. 1, a first battery 180 and a second battery 182 are shown. As will be discussed further below, in some implementations, the system 100 can also comprise a plurality of rails (see FIG. 3) and a gear motor (see FIG. 4). In addition, in one implementation, the system 100 can include a first speed controller, a second speed controller, and a switch configured to turn the gear motor on and off. In some implementations, a user 190 can interact with and/or manipulate controls of the system 100. For example, the user 190 may adjust the system's settings through manipulation of a handle 140, as will be discussed with respect to FIG. 2.

It should be understood that in different implementations, the system 100 can be associated with a parachute. For example, after ejection of the seat 110, a parachute may be used to slow the motion of the seat 110 through the atmosphere by creating drag (or in the case of ram-air parachutes, aerodynamic lift). Parachutes are usually made of light, strong cloth, silk, nylon, polyesters, and/or other composite materials with good tear strength, low permeability, light weight, and/or reduced packing volumes. Parachutes often take the shape of a dome, but shapes may vary including some taking the shape of an inverted dome. In some implementations, system 100 can include a compartment in which to store a parachute, and/or a control system to allow activation or release of the parachute.

Figure 3A:
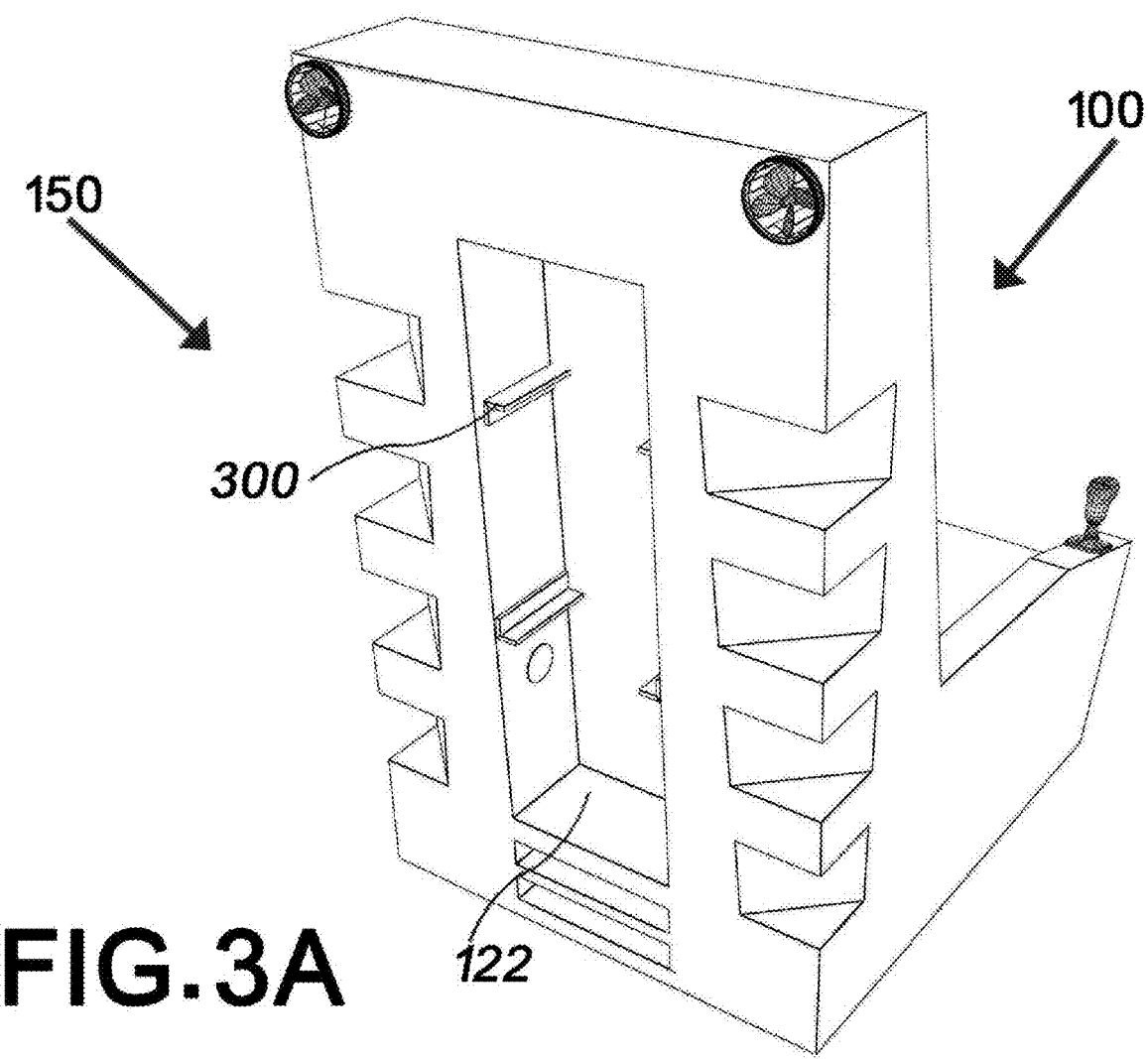
FIGS. 3A & 3B illustrate an implementation of a rear view of a pilot seat.
Figure 3B:
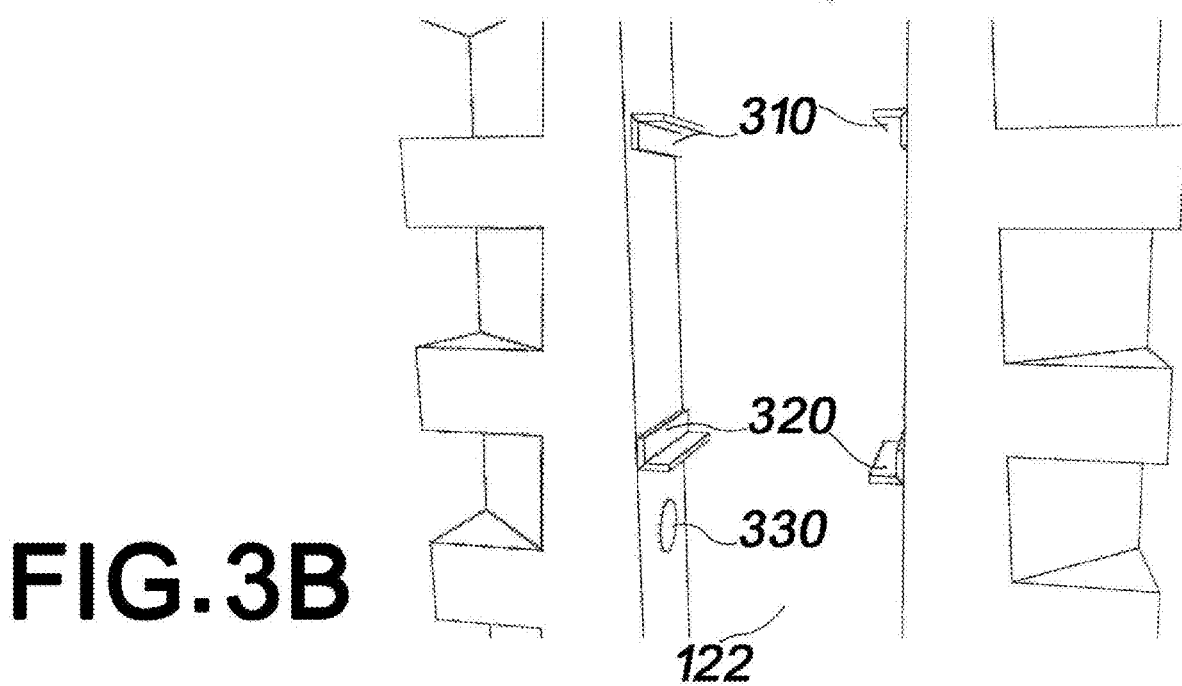
Figure 4:
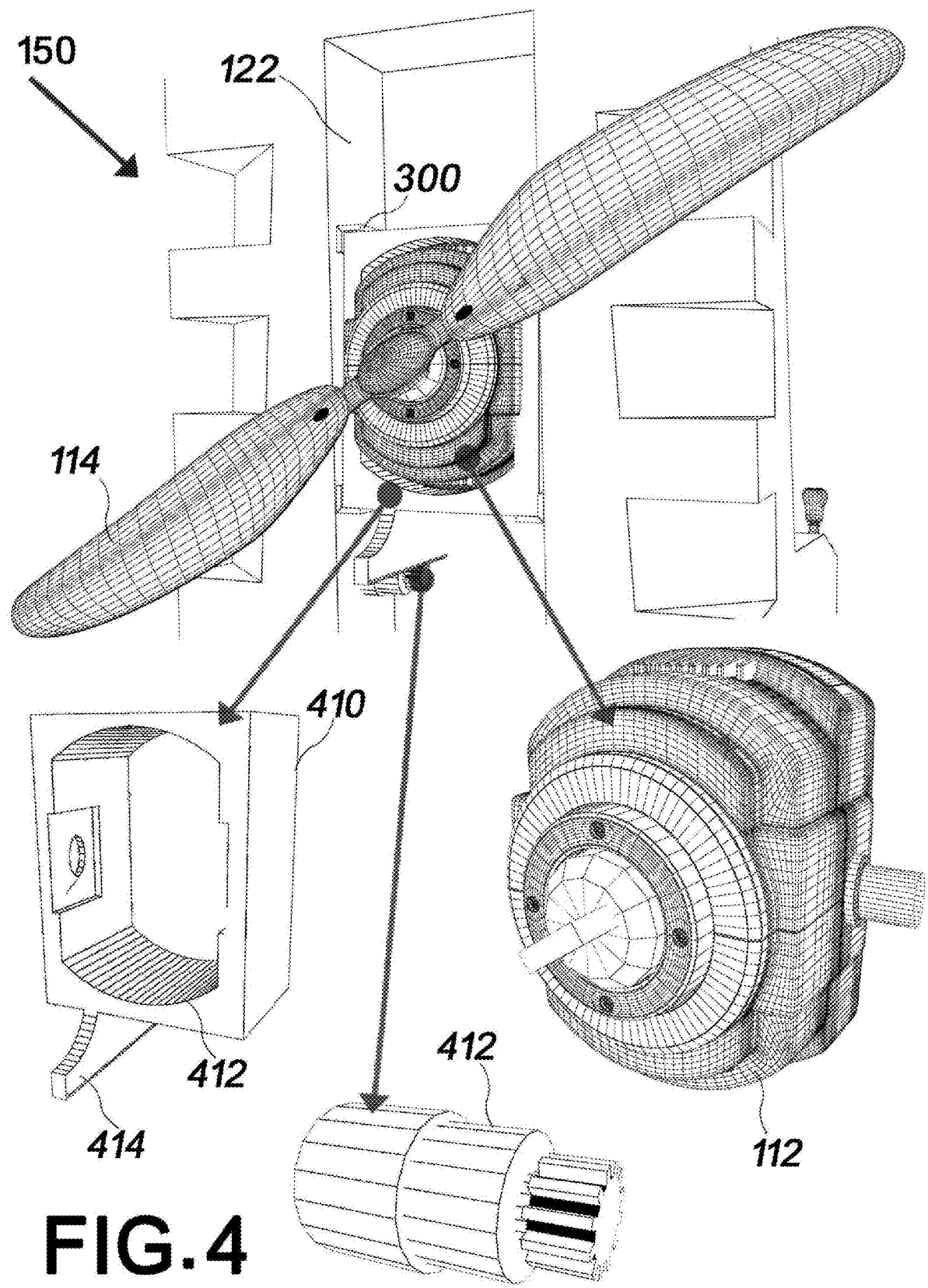
FIG. 4 illustrates an implementation of a propeller-equipped brushless motor and a gear motor.

FIGS. 2-4 provide greater detail with respect to the system 100 introduced in FIG. 1. As shown in FIGS. 2A and 2B, in some implementations, the system 100 includes a device by which a user can adjust settings associated with the system 100. For example, in FIGS. 2A and 2B, the handle 140 is depicted as a type of joystick lever that can be moved in one or more directions to allow some control of seat movement. In other implementations, the user interface can differ, and provide similar functions to those described below.

In one implementation, the device is a handle 140 that is associated, attached, or disposed along one of the side portions 160 of the seat. For example, the handle 140 can extend upward from an arm of the seat and be configured for easy access to a user. In other implementations, the switch can be located along any region of the seat 100 that is accessible to a user. For example, in one implementation the switch can be foot-activated.

In the magnified view of FIG. 2B, the handle 140 includes a switch 212, a first speed controller 214, and a second speed controller 216. In some implementations, when the switch 212 is activated (for example, in a push-button switch design, a user may push the switch to activate it), the gear motor can begin to run, activating the brushless motor. In addition, the first speed controller 214 may be used to transmit commands and/or otherwise permit control of the brushless motor. In one implementation, the first speed controller 214 allows a user to adjust a speed of the seat through control of a rotation speed of the brushless motor. In some implementations, the first speed controller 214 can also be configured to control or adjust the first duct fan and the second duct fan (see FIG. 1), as well as some of the motion of the seat itself. In some other implementations, the second speed controller 216 can allow a user to accelerate the pilot seat by changing the rotation speed of the brushless motor and the duct fans. However, in some implementations, the decision to accelerate the pilot seat may increase battery expenditure, thereby decreasing the duration in which the pilot seat can move. In one implementation, the second speed controller is configured to increase or decrease the speed of the seat through a change of the acceleration of the rotation speed of the brushless motor.

FIG. 3A illustrates an isometric rear view of the pilot seat and FIG. 3B provides a magnified view of a portion of the system 100 of FIG. 3A. As shown in FIGS. 3A and 3E, in some implementations, the seat 110 can include provisions to facilitate the assembly and/or the coupling of various components to the system 100. For example, in FIGS. 3A and 3B, the rear portion 150 includes a plurality of rails ("rails") 300 disposed in the hollow channel 122. The rails 300 can be configured to receive, engage with, hold, and/or support the brushless motor (see FIG. 1). As shown in FIG. 3B, there may be a first rail set 310 and a second rail set 320. The first rail set 310 includes a first rail associated with a first channel sidewall portion and a second rail associated with a second channel sidewall portion disposed opposite to the first channel sidewall portion. In addition, the second rail set 320 includes a third rail associated with the first channel sidewall portion and a fourth rail associated with the second channel sidewall portion. Thus, the first rail and the second rail can be substantially parallel in some implementations. Similarly, the third rail and the fourth rail can be substantially parallel in some implementations. Each rail can comprise a cross-sectional shape similar to an L-shape in one implementation. Thus, in some implementations, while one edge of a rail is disposed directly against a surface of an channel sidewall portion, the rail, can include an overhang or shelf portion that extends inward towards a midline. Each of the four overhang portion can be configured to form a stable framework or receptacle in which the brushless motor can be inserted. The rails 300 may be made of aluminum according to an aspect of the instant application, though in other implementations, the rails 300 can be made of any durable materials, particularly materials that are substantially non-corrosive, lightweight, non-combustible, non-sparking, and/or nonmagnetic.

In one implementation, the brushless motor may be moved axially into the region associated with the rails 300 during assembly of the system. In addition, a gear motor (see FIG. 4) may be inserted or received by an aperture 330 formed in the hollow channel 122. In some implementations, aperture 330 is formed within the surface of an channel sidewall portion, and located below the rails 300, as shown in FIG. 3B. While the aperture 330 is depicted on first channel sidewall portion associated with a left side in FIG. 3B it should be understood that the aperture 330 can be formed on the opposing or second channel sidewall portion in other implementations.

In FIG. 4, a view of the propulsion system is depicted. An assembled view is provided near the top of the figure, and an exploded view of some components comprising the propulsion system is shown in the lower portion of the figure. As noted above with respect to FIGS. 3A and 3B, components can be inserted into or secured in regions along the interior of the hollow channel 122.

For example, in different implementations, a gear motor 412 can be inserted within the aperture 330 of FIG. 3. Thus, in one implementation, the aperture 330 can be sized and dimensioned to snugly receive the cylindrical shape of the gear motor 412, as shown in FIG. 4. In addition in some implementations, the brushless motor 112 can be disposed or inserted within a chamber portion 412 of a brushless motor receptacle ("receptacle") 410. The outer shape of the chamber portion 412 of the receptacle 410 can be sized and dimensioned to correspond to the framework provided by the rails 300 and be snugly received into the rail arrangement as described above. In some cases the receptacle 410 may be made of aluminum, though in other cases the receptacle can comprise any durable materials, particularly materials that are substantially non-corrosive, lightweight, non-combustible, non-sparking, and/or nonmagnetic. Thus, once the receptacle 410 is slid into the compartment provided by rails 300, it can be disposed directly above gear motor 412.

As shown in FIG. 4, in some implementations, the receptacle 410 can include a lower portion 414 that extends downward from the chamber portion 412. In one implementation, the lower portion 414 includes a lower edge that is geared or comprises a series of teeth. When the propulsion system is assembled the lower edge can be in contact with and/or engage with the gear motor 412. The gear motor 412 is configured to move the receptacle containing the brushless motor along the plurality of rails, thereby moving the propeller in an axial direction. Thus, in an initial state, the propeller 114 may be in a substantially vertical position within the groove provided by the hollow channel 112. In other words, the propeller 114 is in a storage configuration, and the blades are substantially aligned with a vertical axis, in the initial position. This can improve safety and allow space in the overall flight assembly to be freed during normal operations.

When the gear motor 412 is activated by the switch (see FIG. 2B), the rotation of the gear motor 412 may engage the lower portion 414 and cause the brushless motor to move or slide axially, in an outward direction, along the rails 300. The propeller 114 is coupled to the brushless motor 112, which can provide the driving force to move the seat 110 by propulsion. Thus, axial motion of the brushless motor 112 also moves the propeller 114 in an outward direction. Once the propeller 114 is disposed outside of the hollow channel 112, the blades may be free to move and/or turn. In some implementations, a 24 Volt and/or a 30 RPM gear motor may be used. Moreover, in other implementations, the propeller may be made of aluminum materials and/or materials that, are substantially durable, non-corrosive, lightweight, non-combustible, non-sparking, and nonmagnetic. The length of the propeller can vary depending on the overall system in which it will be used. Thus, in different implementations, the length of the propeller from end to end can vary between 50 cm and 300 cm long.

Figure 5A:
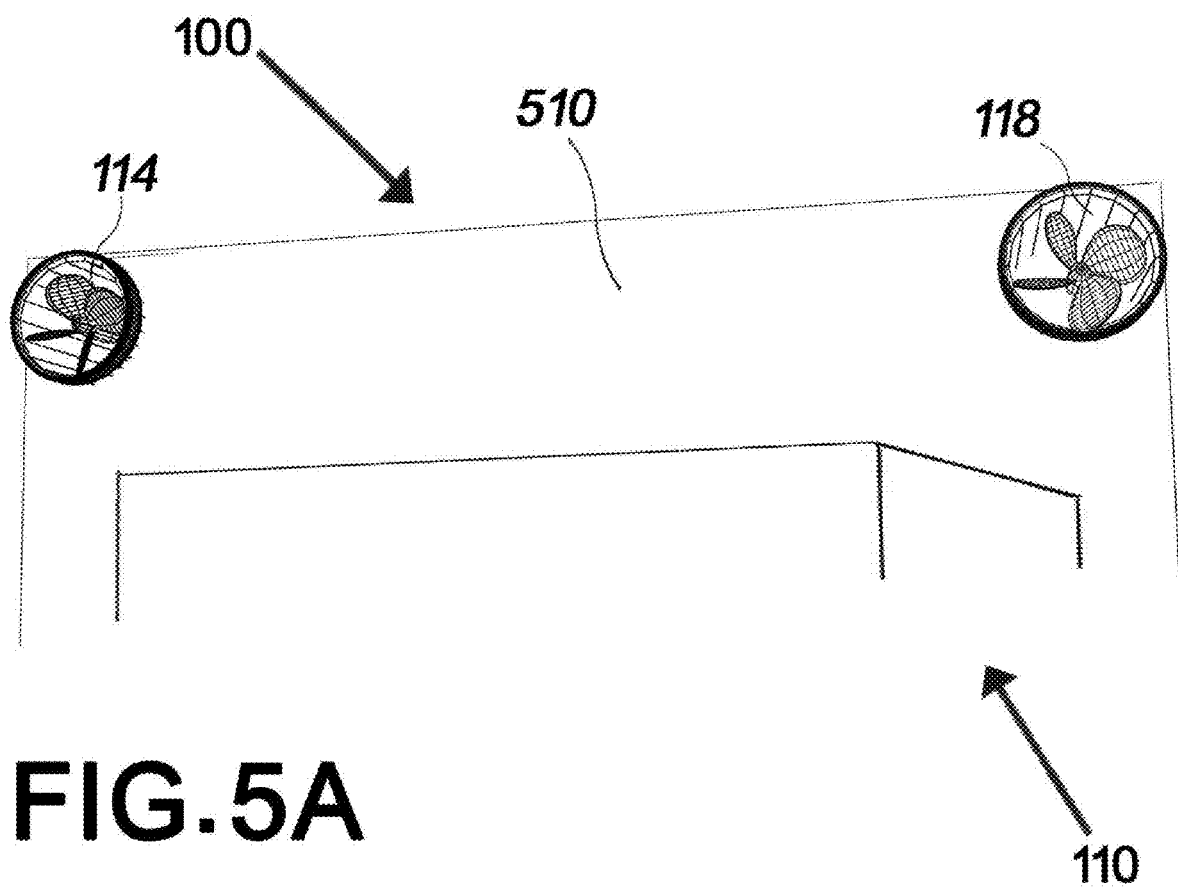
FIGS. 5A and 5B illustrate an implementation of duct fans.

In different implementations, the system can include provisions for improving the efficiency of the motion of the seat during an ejection procedure. As noted above, the system disclosed herein may also comprise one or more air duct fans. Referring now to FIG. 5A, an isometric rear view of a portion of the system 100 is shown where system 100 includes first fan 116 and second fan 118. Each fan has been positioned along the upper two corners adjacent to the seat 110, on a forward-facing portion 510 of the system 100. The fans are thus spaced apart to decrease interference with a user's activities, though in other implementations, one or more fans can be positioned behind a user's head. Thus, the first fan 116 is located along the forward-facing portion 510 on a first upper corner of the seat 110 and a second duct fan 118 is located along the forward-facing portion 510 on a second upper corner opposite to the first upper corner of the seat 110.

Figure 5B:
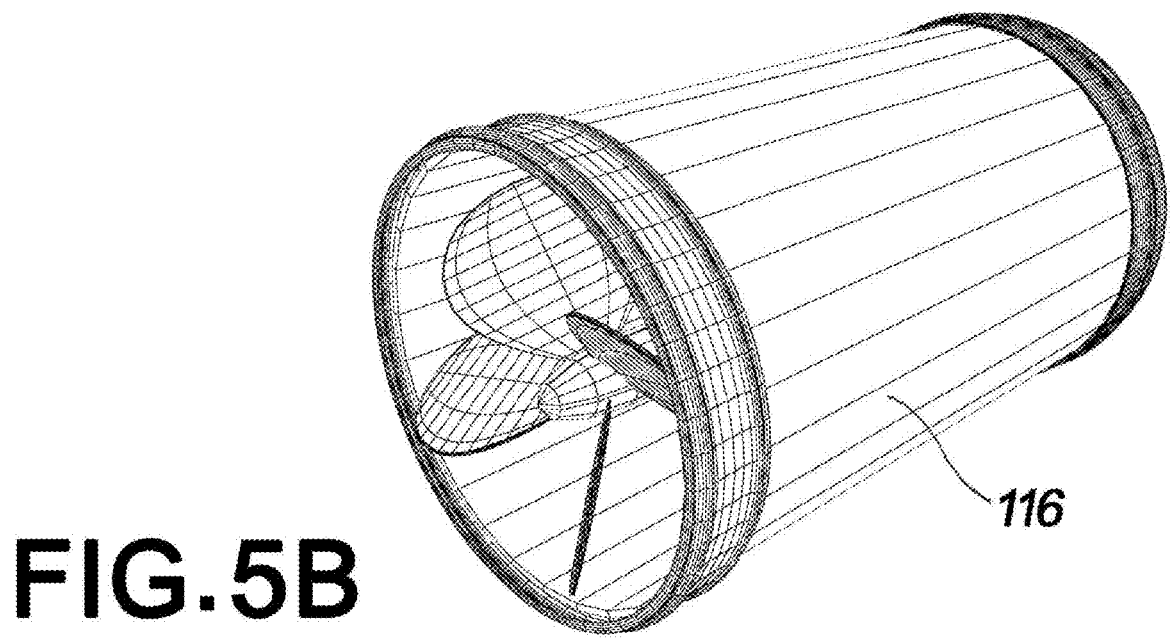

In FIG. 5B, an isolated view of the first fan 116 is depicted for purposes of clarity. It can be understood that in some implementations, the seat 110 of FIG. 5A can include apertures or openings that are sized and dimensioned to receive the first fan and/or the second fan, as well as facilitate connections with other components of the system 100. In some implementations, the fans are configured to help move the pilot seat axially after ejection. Furthermore, in one implementation, the duct fans may be approximately 90 mm in size, though in other implementations, the duct fans can comprise a size between 40 mm and 160 mm. In addition, the duct fans can be equipped to run with a rotation speed of 39000 rpm and a maximum current of 62 A, though in other implementations, the rotation speed can range between 20000 rpm and 55000 rpm, and the current can range in a corresponding manner.

Figure 6:
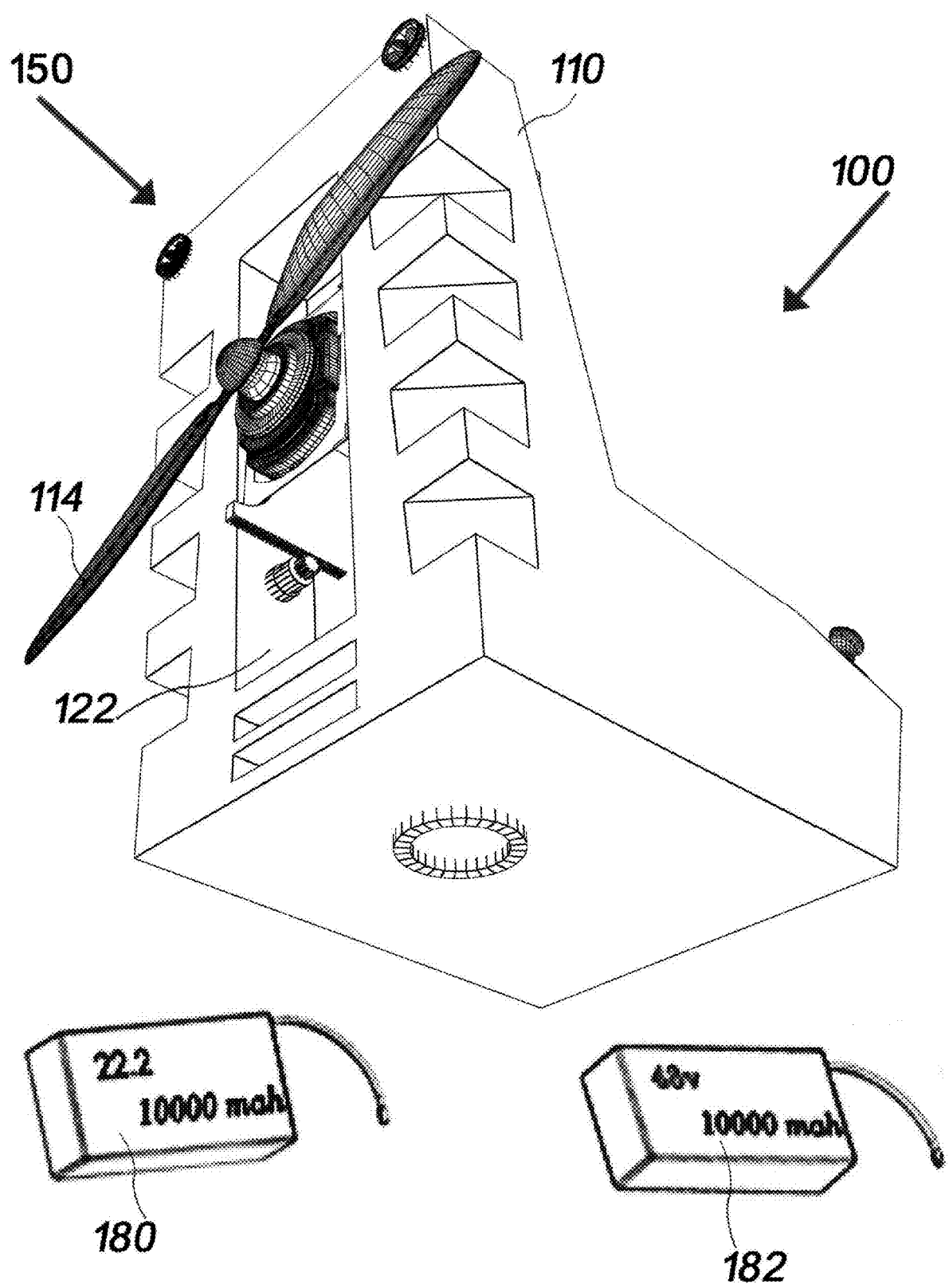
FIG. 6 illustrates an implementation of an energy source for the brushless motor and the duct fans.

In some cases, the rotation of the propeller (see FIG. 4) may create a kind of vacuum effect or vacuum environment near or adjacent to the rear of the seat 110, which in turn may have an adverse effect on the propulsion and speed of the seat 110. The system 100 can include provisions to reduce the adverse effects of such a vacuum in some implementations. For example, referring now to the isometric view of FIG. 6, in different implementations, recesses 120 can be formed along the rear portion 150 of the system 100. In some cases, the recesses 120 are configured to facilitate air flow and improve efficiency of the propulsion system. In one implementation, the recesses 120 can be spaced apart and arranged to extend from the top of the seat 110 to the bottom of the seat 110. In FIG. 6, there are four recesses formed along each side of the seat 110, providing a total of eight recesses in the system 100. The recesses 120 are arranged such that they are present along substantially equally spaced intervals on each side in one implementation, and can be substantially similar in size and geometry. In some implementations, the geometry and inner shape of each of the recesses 120 are shaped to improve air suction along the two sides of the seat 110 and help decrease the effects of the vacuum.

FIG. 6 also illustrates additional details with respect to an energy or power source for the system 100. As shown in FIG. 6, the first battery 180 may be disposed or located within a slot or opening formed inside a lower portion of the seat 110. In one implementation, the first battery 180 is inserted or disposed directly below the hollow channel 122. Similarly, the second battery 182 can be disposed in a slot or opening formed below the slot comprising the first battery 180. Thus, in different implementations, the batteries may be removable for easy maintenance, charging, and/or replacement. In other implementations, the batteries can be integrally formed in the system 100.

In some implementations, one battery (such as the first battery 180) can provide energy to the brushless motor, while the other battery (such as the second battery 182) may provide energy to the first air duct fan and the second air duct fans. Furthermore, in some implementations, the first battery 180 and/or the second battery 182 may comprise Li-polymer batteries, or other types of rechargeable, long-life batteries. In one implementation, one battery can comprise a 48 Volt and 10 A Li-polymer battery, and the other battery may comprise a 22.2 Volt and 10 A Li-polymer battery. However, depending on the needs and specifications of the system, the voltage and amperage associated with a battery can vary.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. An emergency ejection seat system comprising:
a seat including a first side portion extending along a first side of the seat, a second side portion extending along a second side of the seat, and a rear portion associated with a back of the seat; and
a hollow channel formed in the rear portion, the hollow channel configured to receive a propeller system including a brushless motor, a propeller, a receptacle, and a gear motor, wherein the receptacle is configured to receive the brushless motor, and the brushless motor is coupled to the propeller;
a first air duct fan and a second air duct fan, the first air duct fan being disposed in an opening formed in a forward-facing side of the seat, the first air duct fan being configured to move the seat axially after ejection;
a power source; and
a user interface comprising a switch, the switch being configured to turn the gear motor on and off.

2. The system of claim 1, wherein the propeller is configured to propel the seat during an ejection procedure.

3. The system of claim 1, wherein the gear motor is disposed within an aperture formed in a first sidewall portion of the hollow channel.

4. The system of claim 2, wherein a plurality of rails are arranged to form a framework in the hollow channel, the framework being configured to receive the brushless motor.

5. The system of claim 4, wherein the brushless motor is disposed above the gear motor, and wherein the brushless motor includes a lower portion that is in contact with the gear motor.

6. The system of claim 5, wherein the activation of the gear motor is configured to move the receptacle containing the brushless motor along the plurality of rails, thereby moving the propeller in an axial direction.

7. The system of claim 1, wherein the second air duct fan is spaced apart from the first air duct fan.

8. The system of claim 1, wherein the power source comprises a first battery, the first battery being configured to supply energy to the brushless motor.

9. The system of claim 8, wherein the power source further comprises a second battery, the second battery being configured to supply energy to the first air duct fan and the second air duct fan.

10. The system of claim 8, wherein the first battery is disposed in a slot formed in the rear portion below the hollow channel.

11. The system of claim 1, wherein the user interface comprises a lever disposed along a side portion of the chair.

12. The system of claim 11, wherein the lever further comprises a first speed controller configured to adjust a speed of the seat through control of a rotation speed of the brushless motor.

13. The system of claim 12, wherein the lever further comprises a second speed controller configured to increase or decrease the speed of the seat through acceleration of the rotation speed of the brushless motor.

14. The system of claim 4, wherein each rail of the plurality of rails has a cross-sectional L-shape.

15. The system of claim 1, further comprising a plurality of recesses formed in the rear portion of the seat.

16. The system of claim 15, wherein the recesses are spaced apart along substantially equal intervals.

17. The system of claim 15, wherein the recesses are configured to facilitate air flow and improve efficiency of the propulsion system.

18. The system of claim 15, wherein the recesses are substantially similar in size and geometry.

19. The system of claim 15, wherein the recesses include a wedge-shape.

20. The system of claim 15, wherein the recesses are arranged on either side of the hollow channel.

* * * * *